No. 669,347. Patented Mar. 5, 1901.
J. H. QUINN.
LIQUID MEASURING DEVICE.
(Application filed Jan. 7, 1901.)
(No Model.)
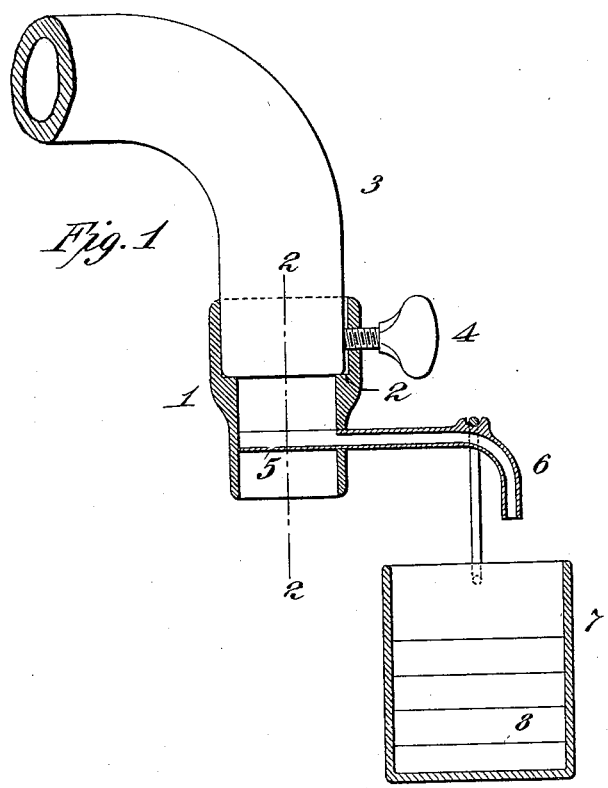
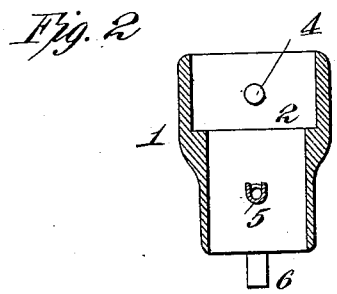
Witnesses:
Jas. F. Coleman
Jno. R. Taylor
Inventor
James H. Quinn
by
Dyer Edmunds & Dyer
Att'ys.
THE NORRIS PETERS CO., PHOTO-LITHO., WASHINGTON, D. C.

UNITED STATES PATENT OFFICE.

JAMES H. QUINN, OF BROOKLYN, NEW YORK, ASSIGNOR OF ONE-HALF TO JOHN J. EAGAN, OF SAME PLACE.

LIQUID-MEASURING DEVICE.

SPECIFICATION forming part of Letters Patent No. 669,347, dated March 5, 1901.

Application filed January 7, 1901. Serial No. 42,302. (No model.)

*To all whom it may concern:*

Be it known that I, JAMES H. QUINN, a citizen of the United States, residing in the borough of Brooklyn, in the city and State of New York, have invented a certain new and useful Improvement in Liquid-Measuring Devices, of which the following is a specification.

My invention relates to an improved liquid-measuring device adapted particularly for use by saloon-keepers to determine the amount of beer or other liquid drawn into a vessel of unknown capacity; and my object is to provide a simple, cheap, and efficient device for the purpose which can be readily applied to any faucet or spigot or removed therefrom when desired.

In order that the invention may be better understood, attention is directed to the accompanying drawings, forming a part of this specification, and in which—

Figure 1 is a sectional view showing my improved measuring device applied to an ordinary spigot, and Fig. 2 a section on the line 2 2 of Fig. 1.

In both of the above views corresponding parts are represented by the same numerals of reference.

1 represents a cylindrical body formed with a seat 2 and adapted to be fitted over the desired spigot or faucet 3, the latter making a tight joint with the seat. The cylindrical body 1 is held in place in any suitable way, as by means of a thumb-screw 4, whereby the body may be applied to faucets of different diameters, all of which, however, will engage tightly with the seat, as explained. Mounted centrally within the body 1, near its lower end and preferably in line with the thumb-screw 4, is a trough 5, which connects and is preferably formed integrally with an auxiliary measuring-nozzle 6, whereby the liquid may pass from the inside of the cylindrical body to the auxiliary measuring-nozzle, as will be understood. Removably carried by the auxiliary measuring-nozzle is a measuring vessel 7, made, preferably, of glass and having graduation-marks 8 8 for indicating the contents thereof.

In operation liquid passing from the spigot or faucet 3 will flow out of the cylindrical body of the device into the proper receiving vessel. A small, but proportional, quantity of this liquid will be deflected through the auxiliary measuring-nozzle into the measuring vessel 7, whereby the amount of liquid accumulating in said vessel will offer an accurate indication of the larger amount of liquid passing into the vessel to be supplied. If, for example, the size of the trough 5 be so proportioned as to deflect through the auxiliary measuring-nozzle one-twentieth of the liquid passing through the body 1, an indication on the measuring vessel 7, indicating one-twentieth of a quart, for example, will represent a full quart entering the vessel to be supplied. When a proper amount of liquid has thus been drawn off, the flow is stopped, and the small amount of liquid in the measuring vessel 7 may be returned either to the source of supply or emptied into the vessel to be partially or wholly filled. In the latter case the indicating-marks 8 on the measuring vessel will be so placed that when the liquid therefrom is emptied into the vessel to be supplied the proper quantity of liquid will have been furnished to the latter.

When the device is to be used entirely for the measuring of fixed amounts, as quarts or gallons, it will be obvious that the measuring vessel 7 may be made of the proportionate size to be completely filled when the proper amount of liquid has entered the vessel to be supplied therewith.

Having now described my invention, what I claim as new, and desire to secure by Letters Patent, is as follows:

1. As a new article of manufacture, a liquid-measuring device comprising a casing adapted to be secured to a spigot or faucet, a trough mounted in said casing and extending therein, an auxiliary measuring-nozzle connected to the trough, and a measuring vessel carried by said nozzle, substantially as set forth.

2. As a new article of manufacture, a liquid-measuring device comprising a casing adapted to be secured to a spigot or faucet, a trough mounted in said casing and extending therein, an auxiliary measuring-nozzle connected to the trough, and a measuring vessel removably carried by said nozzle, substantially as set forth.

3. As a new article of manufacture, a liquid-measuring device comprising a cylindrical body, means for removably securing said body to a faucet or spigot, a trough carried by the body and extending interiorly thereof, an auxiliary measuring-nozzle connected to said trough, and a measuring vessel carried by said nozzle, substantially as set forth.

4. As a new article of manufacture, a liquid-measuring device comprising a cylindrical body, means for removably securing said body to a faucet or spigot, a trough carried by the body and extending interiorly thereof, an auxiliary measuring-nozzle connected to said trough, and a measuring vessel removably carried by said nozzle, substantially as set forth.

5. As a new article of manufacture, a liquid-measuring device comprising a cylindrical body, a thumb-screw for removably securing said body to a spigot or faucet, a trough carried by the body and extending radially within the same in line with said thumb-screw, an auxiliary measuring-nozzle connected to said trough, and a measuring vessel carried by said nozzle, substantially as set forth.

6. As a new article of manufacture, a liquid-measuring device comprising a cylindrical body, a thumb-screw for removably securing said body to a spigot or faucet, a trough carried by the body and extending radially within the same in line with said thumb-screw, an auxiliary measuring-nozzle connected to said trough, and a measuring vessel removably carried by said nozzle, substantially as set forth.

This specification signed and witnessed this 31st day of December, 1900.

JAMES H. QUINN.

Witnesses:
FRANK O. PETERSON,
OTTO F. PETERSON.